United States Patent
Cazier et al.

(10) Patent No.: US 8,698,915 B2
(45) Date of Patent: Apr. 15, 2014

(54) CONFIGURING AN IMAGE CAPTURING DEVICE BASED ON A CONFIGURATION IMAGE

(75) Inventors: Robert P Cazier, Fort Collins, CO (US); Murray Dean Craig, Loveland, CO (US); Susan E. Manson, Berthoud, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 43 days.

(21) Appl. No.: 13/452,641

(22) Filed: Apr. 20, 2012

(65) Prior Publication Data

US 2013/0278780 A1    Oct. 24, 2013

(51) Int. Cl.
*H04N 5/228* (2006.01)
*H04N 5/232* (2006.01)

(52) U.S. Cl.
USPC ...................................................... 348/222.1

(58) Field of Classification Search
CPC .......................... H04N 5/228; H04N 5/23225
USPC ...................................................... 348/207.1
See application file for complete search history.

(56) References Cited

U.S. PATENT DOCUMENTS

| | | | |
|---|---|---|---|
| 5,845,044 A | 12/1998 | Iizuka et al. | |
| 6,862,040 B1 | 3/2005 | Sawachi | |
| 6,903,762 B2 | 6/2005 | Prabhu et al. | |
| 7,355,635 B2 | 4/2008 | Hoshuyama | |
| 2003/0095810 A1* | 5/2003 | Haines et al. | 399/84 |
| 2004/0222300 A1* | 11/2004 | Strickland | 235/462.15 |
| 2007/0296836 A1 | 12/2007 | Silverbrook et al. | |
| 2008/0231716 A1* | 9/2008 | Anderson | 348/211.3 |
| 2010/0110212 A1* | 5/2010 | Kuwahara et al. | 348/222.1 |
| 2011/0234829 A1* | 9/2011 | Gagvani et al. | 348/222.1 |

FOREIGN PATENT DOCUMENTS

JP    7079375 B    8/1995

* cited by examiner

*Primary Examiner* — Gary C Vieaux

(57) ABSTRACT

A method is disclosed for operating an image capturing device. The method is performed by one or more processors of the image capturing device. The one or more processors detect a configuration image using a lens of the image capturing device. The configuration image is associated with information for configuring the image capturing device. The one or more processors determine a set of image capturing settings based on the information and captures an image other than the configuration image using the determined set of image capturing settings.

18 Claims, 4 Drawing Sheets

CONFIGURING AN IMAGE CAPTURING DEVICE BASED ON A CONFIGURATION IMAGE

BACKGROUND OF THE INVENTION

Image capturing devices have become prevalent with the advancement of camera technology. A variety of different image capturing devices exists, such as cameras for mobile computing devices (e.g., smart phones), easy point-and-shoot cameras for an average user, digital camcorders, and more advanced digital cameras for professional photographers. Some image capturing devices are easy to use, while others are more advanced and can have a large number of settings in which a user can adjust to take different types and styles of photographs.

BRIEF DESCRIPTION OF THE DRAWINGS

The disclosure herein is illustrated by way of example, and not by way of limitation, in the figures of the accompanying drawings and in which like reference numerals refer to similar elements, and in which.

DETAILED DESCRIPTION

Figure 1:
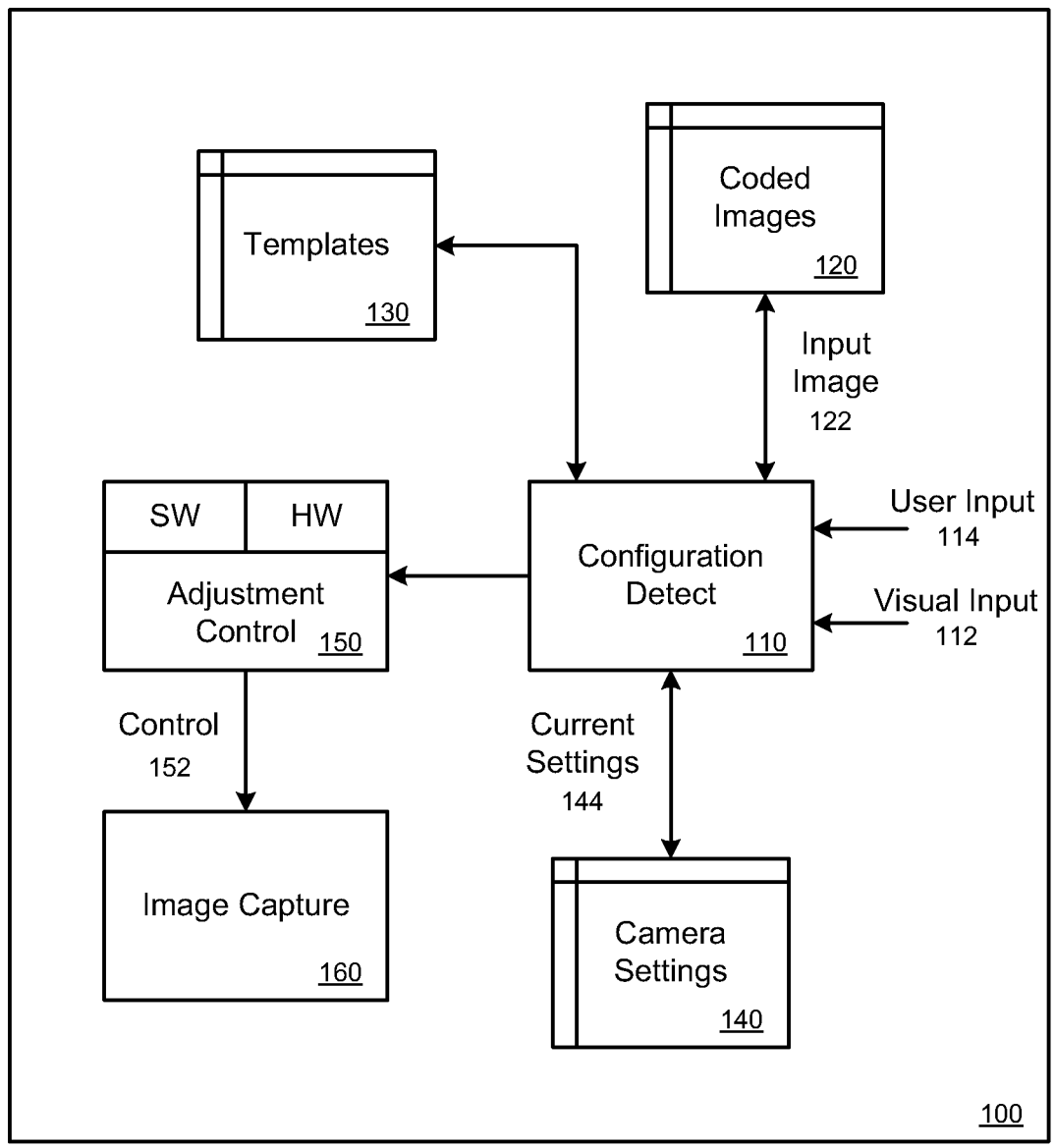
FIG. 1 illustrates an example system for operating an image capturing device, under an embodiment.

Embodiments described herein enable an image capturing device to select an operational setting (e.g., outdoors, night-time, etc.) based on input that corresponds to a designated input image.

Embodiments described herein provide for an image capturing device that is able to detect a configuration image and automatically change one or more of its settings based on the image. For example, in use, a user, such as a professional photographer, can carry around one or more configuration images that each corresponds to different information for configuring the image capturing device. This enables the user to place a configuration image in front of the image capturing device, so that the device can quickly configure its settings and enable the user to capture a scene (e.g., take a picture) with the altered settings.

A configuration image can correspond to a graphic image or bar code that is associated with information for configuring one or more settings of an image capturing device. A user may possess a plurality of different configuration images that each configures the device in a different way (e.g., configure different settings in different ways). In some embodiments, the configuration image can be a graphic image and/or a bar code that is drawn on or printed on a physical material, such as a piece of paper or a card. The configuration image can also be a graphic image or bar code that is displayed on a separate display device.

A user can program a configuration image (including a symbol or picture that is drawn by the user) to be associated with a set of settings for operating the image capturing device. In some instances, one or more configuration images can be predetermined by a third party or the manufacturer of the device. The user can then, at a later time, frame or position the configuration image in front of the lens of the image capturing device so that the image capturing device can detect the configuration image and automatically configure one or more of its settings with the appropriate settings.

More specifically, an image capturing device can operate in a configuration mode (as opposed to a normal/standard image capturing mode) in which the image capturing device can constantly, or periodically, receive visual inputs from its lens. The visual input corresponds to what the lens and/or other components of the image capturing device are focusing on or pointed towards. In one embodiment, when the image capturing device operates in the configuration mode, it can periodically process the visual input received from the lens to determine whether a configuration image is detected.

Each configuration image can be associated with settings information for configuring an image capturing device. Upon detecting a configuration image, the image capturing device can look up the associated information and automatically adjust a set of image capturing settings accordingly. A user can then capture an image other than the configuration image using the adjusted settings.

For example, a photographer can carry around a plurality of different configuration cards (e.g., on a key ring) each showing a configuration image, such as a graphic or a bar code. Each of the configuration images can be associated with different settings information for configuring one or more settings of the image capturing device. The user can place one of the cards in front of the lens of the image capturing device when the device is operating in a configuration mode and the device can determine that the image on the card is a configuration image. Based on the configuration image detected by the device, the device can automatically adjust one or more settings so that the user can quickly and easily capture images without having to change the device settings.

According to an embodiment, the configuration image can be a graphic image (e.g., a drawing of wedding cake or a drawing of a football, etc.) or a bar code (e.g., a quick response code or QR code) that is presented on a display of another device. The image capturing device can detect the configuration image, whether it is physically printed on a piece of paper or presented on a display of another device, by using the lens of the image capturing device. In one embodiment, the configuration image can be detected while the device is being operated in a configuration mode or settings mode. The user of the device can cause the image capturing device to operate in the configuration mode by using one or more input mechanisms of the device.

Still further, in some embodiments, the user can be prompted to confirm the determined and/or adjusted set of image capturing settings via a user interface feature. The prompt can be presented on the display of the image capturing device. The user can accept or reject the settings, for example, before capturing the image (other than the configuration image) using the determined settings. In one embodiment, once the image capturing device determines the set of image capturing settings in the configuration mode (and/or once the user confirms or rejects the determined settings), the image capturing device can automatically exit the configuration mode to return to the image capturing mode. In the image capturing mode, the user can capture one or more images (or videos) by pressing on the image capturing button (or trigger) or other input mechanisms (e.g., via a selectable feature on a touch-sensitive display).

Each configuration image can be associated with information for configuring the image capturing device. For example, one configuration image can configure the image capturing device to turn off the strobe, turn off the shutter sound, and increase the shutter speed, while another configuration image is associated with different settings. In one embodiment, such information for configuring the image capturing device can be preconfigured by a third party. In other embodiments, the information can be configurable by the user of the device. For example, the user can select a set of settings for the image capturing device and associate the selected set of settings with a particular configuration image.

One or more embodiments described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more embodiments described herein can be implemented using programmatic modules or components of a system. A programmatic module or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some embodiments described herein can generally require the use of computing devices, including processing and memory resources. For example, one or more embodiments described herein may be implemented, in whole or in part, on computing devices such as digital cameras, digital camcorders, desktop computers, cellular or smart phones, personal digital assistants (PDAs), laptop computers, printers, digital picture frames, and tablet devices. Memory, processing, and network resources may all be used in connection with the establishment, use, or performance of any embodiment described herein (including with the performance of any method or with the implementation of any system).

Furthermore, one or more embodiments described herein may be implemented through the use of instructions that are executable by one or more processors. These instructions may be carried on a computer-readable medium. Machines shown or described with figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smart phones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, embodiments may be implemented in the form of computer-programs, or a computer usable carrier medium capable of carrying such a program.

System Description

FIG. 1 illustrates an example system for operating an image capturing device, under an embodiment. A system such as described with respect to FIG. 1 can be implemented on, for example, a digital camera or a small-form factor device (e.g., smart phone), or other computing form factors such as tablets, notebooks, desktops computers, and the like. An image capturing device can include a lens and sensor(s) combination to detect and convert light, a processing resource for executing instructions, and memory resources for storing instructions and images. System 100 enables a user to quickly and easily configure a set of settings for an image capturing device. The user can place a configuration image in front of the lens of the image capturing device, and the image capturing device can detect the configuration image and configure a set of settings based on information that is associated with the detected configuration image.

In one embodiment, system 100 can enable a user, such as a professional photographer, to place a configuration image in front of the image capturing device, so that the device can quickly configure its settings and enable the user to capture a scene with the altered settings. The image capturing device can operate in accordance with the settings that are suitable for capturing images (e.g., sporting event, still shots, outdoors, etc.) based on input that corresponds to the configuration image.

System 100 includes configuration detect 110, adjustment control 150, and image capture 160. System 100 also includes code images database 120, templates database 130, and camera settings database 140. The components of system 100 combine to detect a configuration image and to automatically configure a set of settings for the image capturing device based on the information associated with the detected configuration image.

According to embodiments, the configuration detect 110 can receive visual input 112 and user input 114. The visual input 112 can be received via one or more lens of an image capturing device. The image capturing device, such as a camera, can receive light from a scene (e.g., from whatever view and/or object(s) the camera lens is pointing at) by using a lens, one or more filters, and an image sensor. The visual input 112 can be an image of whatever scene is being detected and received from the components of the image capturing device. For example, when the lens of the image capturing device is pointed towards and focusing on a scene, the image of the scene can be presented on a display of the device (e.g., an image preview). A user of the image capturing device can capture the image of the scene by pressing down on a capture button or trigger, or by using another user interface feature (e.g., a graphic feature provided on a touch sensitive display screen). In some cases, the visual input 112 can include a configuration image or a portion of the configuration image.

The configuration detect 110 can receive the visual input 112, which can be any scene and/or object(s) that the lens of the image capturing device is pointed at, and can determine whether the visual input 112 is a configuration image. In one embodiment, the system 100 can operate in a plurality of modes. For example, the system 100 can operate in a standard image capturing mode (e.g., a mode in which a user can take one or more photographs using a capture image input), a manual settings mode (e.g., a mode in which the user can manually adjust one or more settings of the image capturing device) or in a configuration mode. Other modes are also possible (e.g., automatic timing mode, video capturing mode).

The system 100 can operate in a configuration mode in response to a user input 114. The user can switch between operating modes based on user preference. For example, once the user switches the image capturing device operation from a standard image or video capturing mode to the configuration mode, the configuration detect 110 can be enabled. When the image capturing device, however, is operating in the standard image capturing mode, the configuration detect 110 can be disabled to save processing resources.

The configuration detect 110 can perform one or more operations to detect whether the visual input 112 is a configuration image. In some embodiments, when the device is operating in the configuration mode, the configuration detect 110 can periodically process the visual input 112 received to determine whether a configuration image has been placed in front of the lens. Because the image capturing device can receive light from whatever scenes the lens is pointing at, the configuration detect 110 can periodically perform compare or look up operations of the visual input 112 with bar codes in the coded images database 120 and image templates in the templates database 130. If the configuration detect 110 receives a visual input 112 that has a matching graphic image template or a matching bar code (e.g., a matching QR code), the configuration detect 110 can determine that the visual input 112 is a configuration image. According to an embodiment, the configuration detect 110 can also use image processing techniques, such as image recognition software, to detect a configuration image.

According to an embodiment, when the system 100 is operating in the configuration mode, the image capturing device can display a frame or a box on a display of the device. The frame can be other shapes or some other type of boundary in which to frame a configuration image. For example, if the configuration images are QR bar codes, the frame can be a square that is displayed on the display device of the image capturing device. This enables a user to more accurately position the configuration image and the image capturing device for better detection. In some embodiments, the configuration detect 110 can detect a configuration image if the image is substantially framed within the displayed box for a predetermined period of time (e.g., two seconds) or for enough time for the lens to focus on the configuration image. The user can also interact with a user mechanism to signal to the image capturing device that the configuration image is substantially framed within the displayed boundary.

The configuration detect 110 can perform compare operations of the visual input 112 to find bar codes in the coded images database 120 or image templates in the templates database 130 that match the visual input 112. The coded images database 120 can store a plurality of bar codes that each correspond to a bar code configuration image. In some embodiments, the bar codes can be 1D or 2D bar codes, such as a universal product code (UPC) or a QR code. If the visual input 112 is a bar code configuration image that matches a bar code stored in the coded images database 120, an identifier or other information corresponding to the matching bar code can be retrieved by the configuration detect 110.

Similarly, the templates database 130 can store a plurality of graphic images that each correspond to a configuration image. In some embodiments, a plurality of configuration images can be provided by a manufacturer of the image capturing device or by a third party. In cases where the configuration images can be printed on cards (paper or plastic) and provided by the manufacturer or by the third party, the image templates for the configuration images can be stored in the templates database 130. If the visual input 112 is a configuration image that matches a graphic stored in the templates database 130, an identifier or other information corresponding to the matching graphic image can be retrieved by the configuration detect 110.

System 100 can also include a text or character string database for storing phrases or sequences of alphanumeric characters (and/or including symbols). In an alternative embodiment, the text or character string database can be included with the templates database 130. In some cases, a configuration image can be a phrase or a string of characters (e.g., "night time," "lower brightness level," "turn off flash") and the configuration detect 110 can perform look up or search operations in the text or character string database to determine an identifier that matches the configuration image (e.g., the text itself).

In other embodiments, the user can program one or more configuration images with his or her preferences in operating the image capturing device. For example, the user may want to have a configuration image that automatically configures her image capturing device to have a high ISO speed, strobe off, shutter sound off, and high shutter speed. In this case, the user can associate these settings with a configuration image (e.g., a bar code or a graphic image). These settings and the corresponding configuration image can be paired (using identifiers and other information) and stored in respective databases of system 100. In another embodiment, the user can draw any picture, such as a stick figure, and use the picture as a configuration image.

Using the identifier or other information associated with the matching configuration image, the configuration detect 110 can retrieve a set of camera settings from the camera settings database 140. The configuration detect 110 can perform a lookup operation using the image or bar code identifier to find the set of settings that corresponds to the particular identifier. In some embodiments, the camera settings database 140 can include a combination of different camera settings for each identifier. Settings that can be automatically configured or enabled/disabled can include: strobe/flash, shutter sound or other alert sounds, white balance settings (e.g., for indoors vs. outdoors), sharpness, contrast, ISO speed, shutter speed, aperture size, aspect ratio of images, exposure settings, shutter priority, aperture priority, micro vs. macro settings, landscape settings for adjusting depth of fields, timers, audio sensitivity, zoom settings, image and video resolutions, filters, red-eye removal, etc.

For example, the configuration image can be a bar code printed on a card with the phrase "wedding scene" or a graphic image of a wedding cake. In another example, the configuration image can be the text itself with the words "wedding scene." A particular set of settings can correspond to this configuration image. The wedding cake image can represent to the user that this particular configuration image will configure the image capturing device with settings that are typical for taking photographs at a wedding ceremony. The settings, for example, can include the strobe or flash being set to "off," a high ISO speed, a high shutter speed, the shutter sound being set to "off," etc. The remaining settings for the particular configuration image can be set to default or be adjusted in a particular manner as well.

Each of the coded images, such as, for example, 1D or 2D barcodes, that are stored in the coded images database 120 and each of the graphic templates that are stored in the templates database 130 can have a corresponding set of settings stored in the camera settings database 140. In some embodiments, the plurality of configuration images can be provided by a manufacturer of the image capturing device or by a third party. The corresponding settings for each of these configuration images can have a particular set of settings stored in the camera settings database 140.

After the configuration detect 110 looks up and retrieves a set of settings that correspond to the detected configuration image (e.g., via compare operations), it can transfer the settings information to the adjustment control 150. The adjustment control 150 includes logic to control both the software and hardware of the image capturing device. Based on the settings information determined by the configuration detect 110, the adjustment control 150 can configure one or more settings of the image capturing device in accordance with the set of settings corresponding to the particular detected configuration image. The one or more settings can be configured via control 152 so that the image capture 160 can capture images of scenes using the adjusted settings.

Once the adjustment control 150 configures one or more settings via control 152, the system 100 can exit out of the configuration mode and switch to operating in the normal or standard image capturing mode. The user can then capture one or more images (or videos) using the adjusted setting(s). In one embodiment, the user can take a photograph or capture an image by pressing an image capturing input mechanism or trigger on the image capturing device. In other embodiments, the input mechanism can be a selectable feature provided on a touch-sensitive display device.

In some embodiments, some of the components that are described in system 100 can be provided as being part of the same component. For example, the configuration detect 110 and/or the adjustment control 150 and/or the image capture 160 can be provided as being part of the same component. In another embodiment, the configuration detect 110, the adjustment control 150 and the image capture 160 can be provided as part of the device operating system or as part of one of more applications (e.g., as part of a camera application). Logic can be implemented with a camera application (e.g., software) and/or with hardware of the image capturing device.

According to one embodiment, system 100 also enables a user to associate a set of image capturing settings with a particular configuration image for future use. A user can configure one or more settings of the image capturing device, associate the set of settings with a configuration image of his or her choice, and store the associated settings with the chosen configuration image in the camera settings database 140. The image capturing device can be operated in the configuration mode or in a different mode, such as a settings storing mode, in which the system 100 can enable a user to frame a user-selected configuration image in front of the lens and the configuration detect 110 can associate the user-selected configuration image with the current device settings 144.

The user can frame or place any image or bar code in front of the lens and provide a "save" or "store" input using an input mechanism. This tells the image capturing device that when it detects this image at a later time, it should configure itself with the current settings (e.g., the settings configured by the user when the user presses the "store" input mechanism). The configuration detect 110 can store the current settings 144 with a corresponding identifier of the user-selected configuration image in the camera settings database 140. The input image 122 can also be stored in the coded image (if the user-selected configuration image is a bar code) or can be stored in the graphics templates 130 (if the user-selected configuration image is a graphic image).

For example, a third party or the manufacturer of the image capturing device can provide a plurality of configuration images (e.g., different graphic images or bar codes) that do not have predetermined settings information associated with them. A user can frame a bar code, for example, using the lens of the image capturing device, and the system 100 can be used to associate the current device settings with the particular bar code.

In other embodiments, the system 100 can enable a user to draw any picture or pick any image or logo (e.g., from a book or magazine) or characters/words/phrases and use that item as a configuration image for associating with current device settings that have been configured by the user. This enables the user to come up with any uniquely identifiable picture to represent a set of settings for operating the image capturing device. The image capturing device can perform image processing operations, such as by using image recognition software, when storing the graphic images (or bar codes) as being configuration images.

A user can pick and choose a combination of different settings for operating the image capturing device, and associate or tag the set of settings with one of the configuration images. In this way, the user can, at a later time, automatically configure his or her device with the associated settings using the user-selected configuration image.

Methodology

Figure 2:
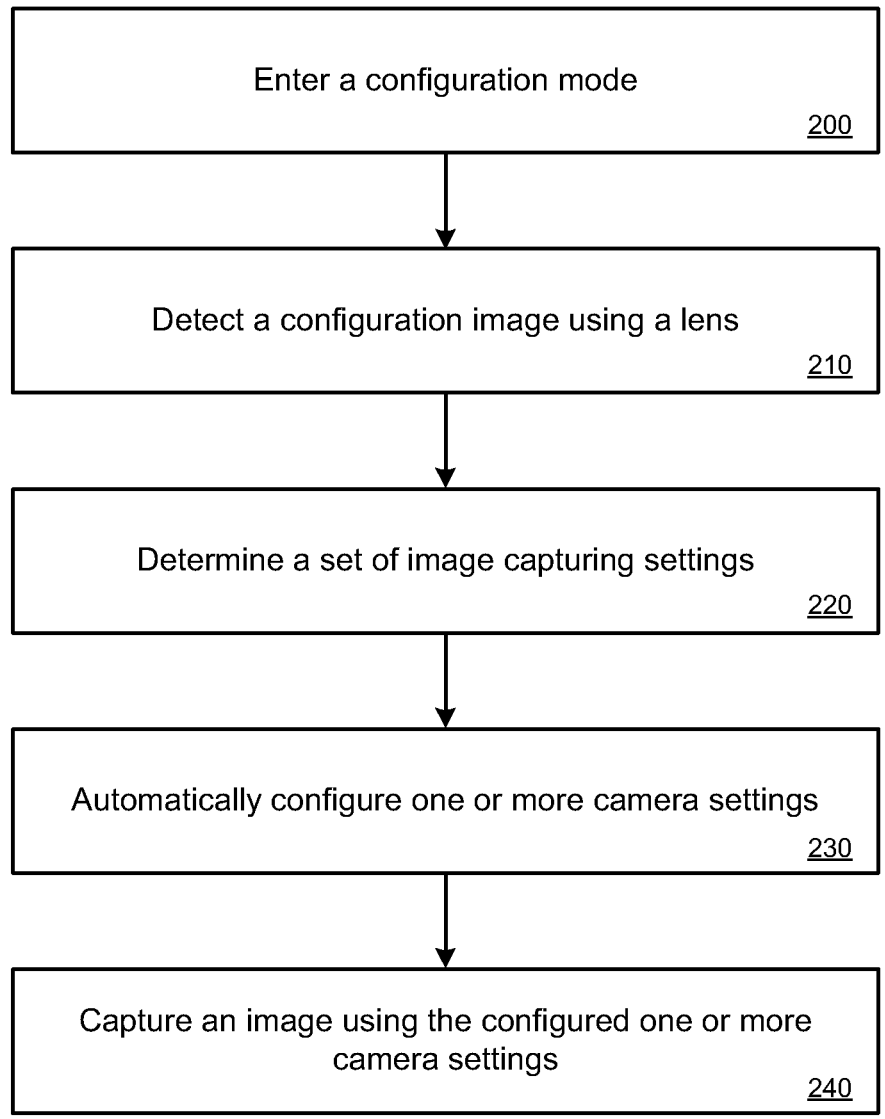
FIG. 2 illustrates an example method for configuring an image capturing device, according to an embodiment.

FIG. 2 illustrates an example method for configuring an image capturing device, according to an embodiment. A method such as described by an embodiment of FIG. 2 can be implemented using, for example, components described with an embodiment of FIG. 1. Accordingly, references made to elements of FIG. 1 are for purposes of illustrating a suitable element or component for performing a step or sub-step being described.

The image capturing device can be operated in a plurality of different modes. Based on a user input, the image capturing device can be switched to operate in a configuration mode (step 200). In the configuration mode, the image capturing device can periodically process the visual input received via its lens (and other components) to determine whether a configuration image is present (e.g., framed or placed in front of the lens). In contrast, when the device is operating in the normal or standard image capturing mode, the device does not process the visual input received in real time to determine whether a configuration image is framed.

For example, the user can operate a menu or settings of the image capturing device to switch between modes. The user can toggle a switch or press a button or select a feature that is provided and displayed on a touch-sensitive display of the device. In one embodiment, when the device is operating in the configuration mode, it can receive frames of the current scene that are detected by the lens (and streamed periodically, e.g., every one second). The device can store the frames in a memory resource or buffer, and analyze the content to determine whether the frame includes or is a configuration image.

The image capturing device can automatically detect a configuration image by analyzing the visual input and performing compare or look up operations of the visual input (step 210). The frame or scene content can be compared with bar codes or graphic templates that are stored in a database. According to an embodiment, the database can be stored remotely or locally in a memory on the image capturing device. For example, the user can place a configuration image in front of the lens when the device is in the configuration mode (and frame the image, e.g., within a boundary that is provided on the display) so that the device can detect the configuration image. In alternative embodiments, the image capturing device can also include a sensing mechanism, such as an infrared bar code reader, for detecting a configuration image, such as a bar code.

In some embodiments, the image capturing device can detect a configuration image when the user indicates (via a user input mechanism) that the scene or content from the visual input is a configuration image. The user can place the configuration image in front of the lens, for example, and interact with an input mechanism (e.g., tap on a feature provided on the touch-sensitive display) to notify the device that the configuration image has been provided. The image capturing device can then perform a look up operation or compare operation of the image within one of more databases (e.g., the graphic templates database and the coded images database) to determine an identifier or other corresponding information.

Based on the detected configuration image, the image capturing device determine a corresponding set of image capturing settings that the device is to operate in (step 220). The set of settings can be determined by using the identifier or information corresponding to the detected configuration image. A set of settings can be associated with each different configuration image. For example, for a QR code that is provided on a card labeled "outdoor sports," the image capturing settings can be tailored for configuring the image capturing device for taking quality photographs in a bright, outdoor setting. The settings can also be tailored for configuring the image capturing device for capturing images with objects or people that are moving quickly. The set of settings (e.g., high iso, flash off, shutter sound on, brightness level set to medium level, etc.) for each configuration image can be stored remotely or locally on the image capturing device.

One or more settings of the image capturing device can be automatically configured based on the determined set of image capturing settings (step 230). In one embodiment, the user can be prompted to accept (confirm) or reject the changes made to the one or more settings. Once the changes are made (if any) based on the detected configuration image, the image capturing device can automatically switch back to a normal or standard image capturing mode (e.g., exit the configuration mode). The device is configured with the settings that the user prefers, and the user can then capture one or more images (or video or audio) using the configured settings (step 240). If a user wants to change the settings again to a set of settings that he or she is familiar with, the user can again repeat the steps described in FIG. 2, so that the image capturing device can detect another configuration image with associated settings for operating the device.

Figure 3:
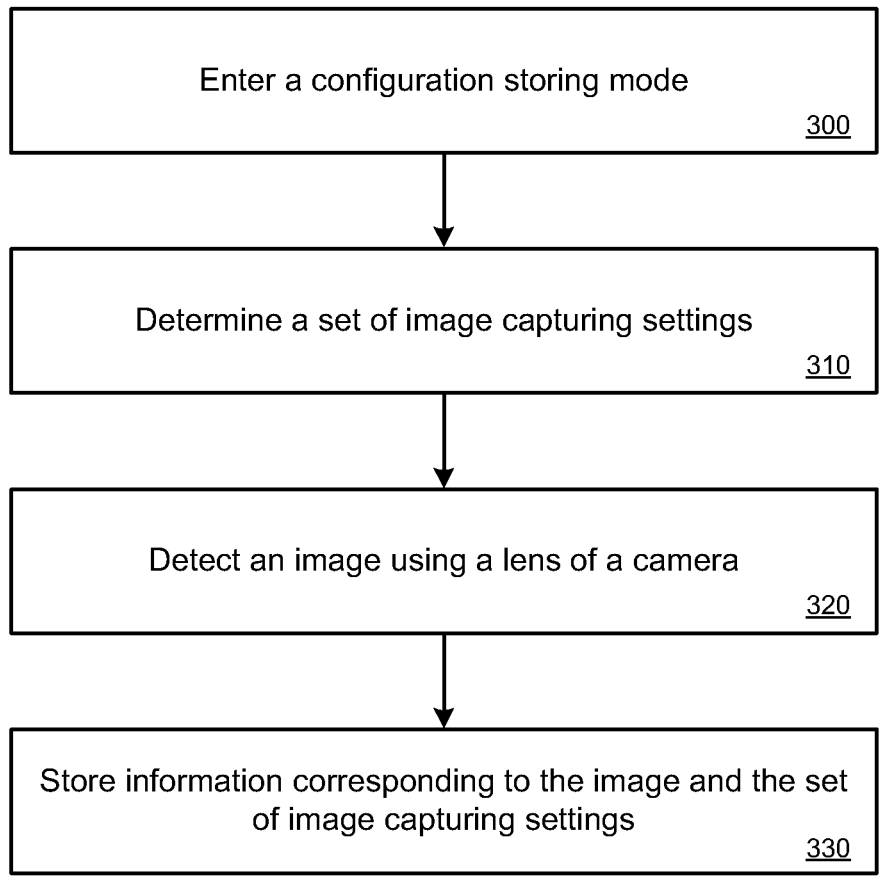
FIG. 3 illustrates an example method for enabling a user to associate configuration settings with a configuration image, under an embodiment.

FIG. 3 illustrates an example method for enabling a user to associate configuration settings with a configuration image, under an embodiment. A method such as described by an embodiment of FIG. 3 can be implemented using, for example, components described with an embodiment of FIG. 1. Accordingly, references made to elements of FIG. 1 are for purposes of illustrating a suitable element or component for performing a step or sub-step being described.

A user of the image capturing device can associate a set of image capturing settings with a particular configuration image. The configuration image can be a predetermined image provided by a third party or the manufacturer (e.g., cards with images drawn on it or images downloaded and presented on another device), or any image or picture drawn by the user (e.g., drawn on a physical piece of paper of drawn on a drawing software running on another device). The user can operate the image capturing device in a configuration storing mode or a programming mode (step 300). This mode can be different from a normal image capturing mode or the configuration mode previously discussed.

When the device is operating in the configuration storing mode, the user can interact with the device via one or more user input mechanisms to program (e.g., store or save) a plurality of different device settings with a particular configuration image. The user can change one or more settings to configure the image capturing device to currently operate using the settings. These current settings can be determined by the system 100 (step 310).

Using the lens of the image capturing device, the system 100 can then detect a configuration image that is selected by the user and placed in front of the lens (e.g., framed) (step 320). The user can use a user input mechanism or a menu selection to associate the framed configuration image with the current set of settings. The user can also be prompted to confirm whether he or she would like to save the current set of settings with the user-selected configuration image. The system 100 can then store the set of settings with the associated configuration image in respective databases with corresponding identifiers (step 330).

Hardware Diagram

Figure 4:
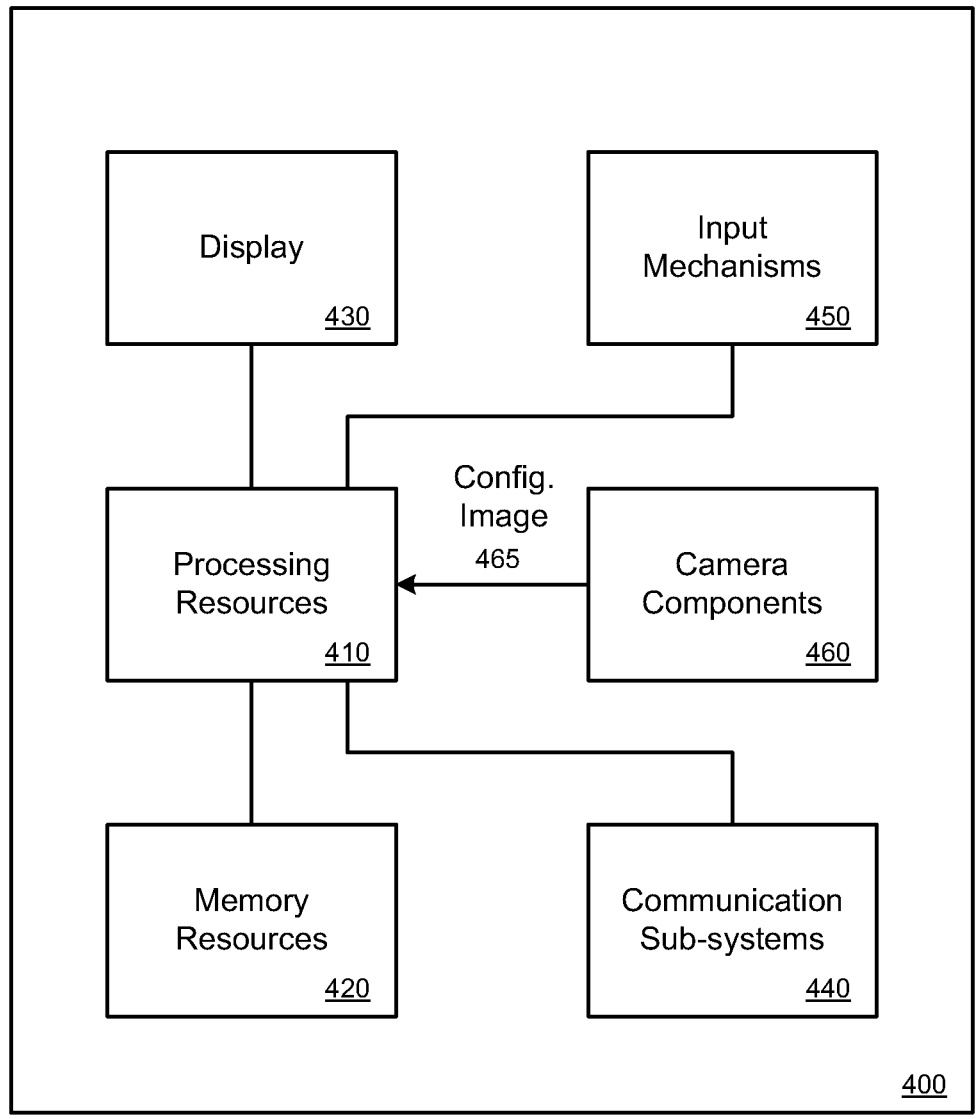
FIG. 4 illustrates an example hardware diagram for a system for operating an image capturing device, under an embodiment.

FIG. 4 illustrates an example hardware diagram of a computer system upon which embodiments described herein may be implemented. For example, in the context of FIG. 1, the system 100 may be implemented using a computer system such as described by FIG. 4. In one embodiment, a computing device 400 may correspond to a mobile computing device, such as a cellular device that is capable of telephony, messaging, and data services. Examples of such devices include smart phones, handsets or tablet devices for cellular carriers, digital cameras, or laptops and desktops (e.g., PC). Computing device 400 includes a processor 410, memory resources 420, a display device 430, one or more communication sub-systems 440 (including wireless communication sub-systems), input mechanisms 450, and camera components 460. In one embodiment, at least one of the communication sub-systems 440 sends and receives cellular data over data channels and voice channels.

The processor 410 is configured with software and/or other logic to perform one or more processes, steps and other functions described with embodiments, such as described by FIGS. 1-3, and elsewhere in the application. Processor 410 is configured, with instructions and data stored in the memory resources 420, to implement the system 100 (as described with FIG. 1). For example, instructions for implementing the configuration detect, the adjustment control, the image capture, and the databases can be stored in the memory resources 420 of the computing device 400. The processor 410 can execute instructions for operating the configuration detect and for receiving visual inputs, including a configuration image 465 from the camera components 460 (e.g., lens, filter). The processor 410 can also automatically configure one or more settings of an image capturing device or camera components (software and/or hardware) based on information associated with the configuration image 465.

According to an embodiment, the processor 410 can provide content to the display 430 by executing instructions and/or applications that are stored in the memory resources 420. The content can include a preview image of a scene in which the lens of the image capturing device is pointed towards or focused on. The content can also be provided in response to a user operating a camera application. The processor 410 can execute instructions (such as instructions stored in the memory resources 420) to detect a configuration image using a lens and other components of the image capturing device, and determine a set of image capturing settings based on information associated with the configuration image. In an alternative embodiment, the computing device 400 can also include a separate detection mechanism, such as a bar code reader, to detect a configuration image (e.g., a bar code). The processor 410 can capture an image other than the configuration image using the determined set of image capturing settings (via the lens and other components of the image capturing device).

ALTERNATIVE EMBODIMENTS

Referring back to FIG. 1, in some embodiments, the system 100 can detect two or more configuration images concurrently. For example, a user of the image capturing device can frame or place three cards that each includes a configuration image in front of the lens of the device. The configuration detect 110 can receive, as visual input 112, two or more configuration images concurrently and perform compare operations using the databases in order to determine what type of adjustments need to be made to the image capture settings.

For example, a user can have three configuration images, the first image can turn off a strobe, the second image can turn off the sound, and the third image can adjust the white balance to tungsten. The user can line up all three images side by side, frame them using the lens of the image capturing device, and the device can automatically configure its settings accordingly.

In another embodiment, the user can individually frame a plurality of configuration images subsequently during a short period of time (e.g., flash three images, one after the other) in order to adjust the settings. For example, the user can have plurality of laminated cards with configuration images printed on each of them (e.g., they can correspond to settings the user frequently uses). The user can pick up the cards she wants and frame each of the cards in front of the lens of the device for a certain amount of time. The amount of time for the user to frame the image can be predetermined or configurable by the user (e.g., set to 0 seconds, 0.5 seconds, 1 second, etc.). The user can frame three images individually and consecutively, so that the device can automatically change its settings in accordance with each of the three configuration images. The amount of time for framing an image can help prevent inadvertent detection of configuration images the user does not want to frame.

In one embodiment, when the user frames a configuration image for an amount of time, the device to automatically adjust one or more of its settings without having the user to confirm the adjustment (e.g., via a user input mechanism). In another embodiment, the user can set a time delay for adjusting the settings to five seconds, for example, so that when the image is framed properly for a period of time, the settings will not be adjusted until after the time delay (which can also be configurable by the user). The user can either confirm the adjustments manually, or after the five seconds, the settings can be adjusted automatically without user confirmation.

It is contemplated for embodiments described herein to extend to individual elements and concepts described herein, independently of other concepts, ideas or system, as well as for embodiments to include combinations of elements recited anywhere in this application. Although embodiments are described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. Thus, the absence of describing combinations should not preclude the inventor from claiming rights to such combinations.

What is claimed is:

1. A method for operating an image capturing device, the method being performed by one or more processors and comprising:

enabling a user to select a plurality of modes for operating the image capturing device, the plurality of modes including at least an image capturing mode and a configuration detection mode;

in response to receiving a user selection of the configuration detection mode, operating image capturing device in the configuration detection mode, the configuration detection mode to:

detect a selected configuration image using a lens of the image capturing device;

compare the selected configuration image to a plurality of stored configuration images in one or more databases of the image capturing device, each stored configuration image being associated with a set of capture settings for the image capturing device;

in response to determining a match between the selected configuration image and a corresponding stored configuration image, determine a corresponding set of capture settings associated with the corresponding stored configuration image; and adjust one or more capture settings of the image capturing device using the corresponding set of capture settings;

in response to adjusting the one or more capture settings, automatically changing operation of the image capturing device from the configuration detection mode to the image capturing mode.

2. The method of claim 1, wherein the selected configuration image is a graphic image, a bar code, or descriptive text that is drawn or printed on a physical piece of paper or card.

3. The method of claim 1, wherein the selected configuration image is a graphic image, a bar code, or descriptive text that is presented on a display mechanism of another device.

4. The method of claim 1, wherein adjusting the one or more capture settings includes prompting the user to confirm the corresponding set of capture settings.

5. The method of claim 1, wherein one or more sets of capture settings associated with one or more stored configuration images are preconfigured by a third party that is not the user.

6. The method of claim 1, wherein one or more sets of capture settings associated with one or more stored configuration images are configurable by the user of the image capturing device.

7. An image capturing device comprising:

a lens;

one or more databases to store a plurality of stored configuration images, each stored configuration image being associated with a set of capture settings for the image capturing device; and one or more processors to enable a user to select a plurality of modes for operating the image capturing device, the plurality of modes including at least an image capturing mode and a configuration mode;

in response to receiving a user selection of the configuration mode, operating the image capturing device in the configuration mode, the configuration mode to:

detect a selected configuration image using the lens;

compare the selected configuration image to the plurality of stored configuration images;

in response to determining a match between the selected configuration image and a corresponding stored configuration image, determining a corresponding set of capture settings associated with the corresponding stored configuration image; and adjust one or more capture settings of the image capturing device using the corresponding set of capture settings, in response to adjusting the one or more capture settings, automatically changing operation of the image capturing device from the configuration mode to the image capturing mode.

8. The image capturing device of claim 7, wherein the selected configuration image is a graphic image, a bar code, or descriptive text that is drawn or printed on a physical piece of paper or card.

9. The image capturing device of claim 7, wherein the selected configuration image is a graphic image, a bar code, or descriptive text that is presented on a display mechanism of another device.

10. The image capturing device of claim 7, wherein adjusting the one or more capture settings includes prompting the user to confirm the determined set of image capturing settings before capturing the image other than the configuration image.

11. The image capturing device of claim 7, wherein one or more sets of capture settings associated with one or more stored configuration images are preconfigured by a third party that is not the user.

12. The image capturing device of claim 7, wherein one or more sets of capture settings associated with one or more stored configuration images are configured by the user of the image capturing device.

13. A non-transitory computer readable medium storing instructions that, when executed by a processor, cause the processor to perform steps comprising:

enabling a user to select a plurality of modes for an image capturing device, the plurality of modes including at least an image capturing mode and a configuration detection mode, in response to receiving a user selection of the configuration detection mode, operating the image capturing device in the configuration detection mode, the configuration detection mode to:

detect a selected configuration image using a lens of the image capturing device;

compare the selected configuration image to a plurality of stored configuration images in one or more databases of the image capturing device, each stored configuration image being associated with a set of capture settings for the image capture device;

in response to determining a match between the selected configuration image and a corresponding stored configuration image, determining a corresponding set of capture settings associated with the corresponding stored configuration image; and adjust one or more capture settings of the image capturing device using the corresponding set of capture settings;

in response to adjusting the capture settings, automatically changing operation of the image capturing device from the configuration detection mode to the image capturing mode.

14. The non-transitory computer readable medium of claim 13, wherein the selected configuration image is a graphic image, a bar code, or descriptive text that is drawn or printed on a physical piece of paper or card.

15. The non-transitory computer readable medium of claim 13, wherein the selected configuration image is a graphic image, a bar code, or descriptive text that is presented on a display mechanism of another device.

16. The non-transitory computer readable medium of claim 13, wherein adjusting the one or more capture settings includes prompting the user to confirm the corresponding set of capture settings.

17. The non-transitory computer readable medium of claim 13, wherein one or more sets of capture settings associated with one or more stored configurations images are preconfigured by a third party that is not the user.

18. The non-transitory computer readable medium of claim 13, wherein one or more sets of capture settings associated with one or more stored configurations images are configurable by the user of the image capturing device.

\* \* \* \* \*